UNITED STATES PATENT OFFICE.

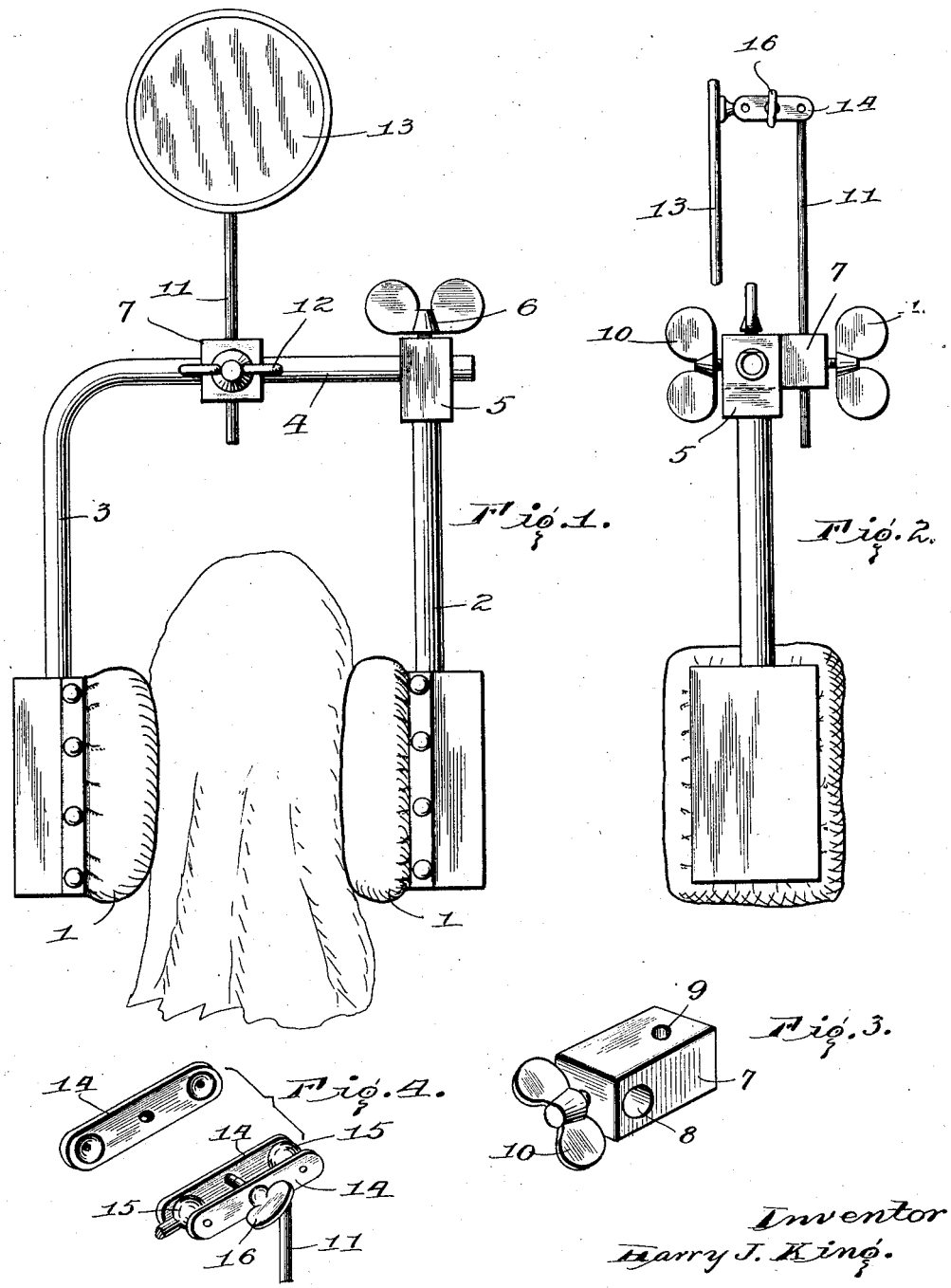

HARRY JOSEPH KING, OF OAKLANDON, INDIANA.

SHAVING-MIRROR.

1,389,053.     Specification of Letters Patent.    Patented Aug. 30, 1921.

Application filed March 22, 1921. Serial No. 454,455.

*To all whom it may concern:*

Be it known that I, HARRY J. KING, a citizen of the United States, residing at Oaklandon, in the county of Marion and State of Indiana, have invented certain new and useful Improvements in Shaving-Mirrors, of which the following is a full, clear, concise, and exact description.

An object of the invention is to provide a shaving mirror having means for attaching it to the person, more especially to the leg of an invalid.

Another object of the invention is to provide such a mirror and supporting means with a number of adjustments whereby the mirror may be placed in practically any position desired.

Other objects of the invention will be apparent from the following description when taken in connection with the accompanying drawing, in which, Figure 1 is a front elevation of the mirror and support in use;

Fig. 2 is a side elevation of the device;

Fig. 3 is a perspective view of one of the adjusting blocks, and

Fig. 4 is a perspective view of several details.

Referring to the drawing more in detail, the numeral 1 designates a pair of leather faced pads adapted to engage the opposite sides of the invalid's leg and clamp the mirror (hereinafter described) thereto. Suitably anchored in one of these pads is the upright 2, while the upright 3 is similarly secured to the other pad. The upright 3 is formed at its upper end with a transverse bar 4, which has its free end inserted in an aperture in the block 5. The block 5 is carried at the upper end of the upright 2 and is provided with a set screw 6. By means of the foregoing structure the support may be readily adjusted to and clamped on the invalid's leg.

The block 7, shown in Fig. 3, is provided with two apertures 8 and 9, the former of which receives the transverse bar 4. A set screw 10 is carried by the block for locking it in adjusted position, either as respects the length of the bar or any position around the circumference of the bar.

The vertically adjustable rod 11 is received in aperture 9 of the block 7 and is held in its various adjusted positions by means of the set screw 12. Adjustably secured to the upper end of the rod or standard 11 is the mirror 13. The mirror is attached to the upper end of the rod by means of two ball and socket joints. These joints are formed by means of the two plates 14, 14, each being provided with substantially semi-cylindrical depressions adapted to receive the balls or knobs 15, 15, one of which is formed on the upper end of rod 11 and the other on the back of the mirror 13 near its upper edge. The plates are provided midway between their ends with a screw 16 by means of which the ball and socket joints may be tightened or loosened as desired.

In operation the set screw 6 is loosened and the pads 1, 1, drawn toward each other to properly clamp the leg, the set screw 6 is then tightened. The rod 11 may then be adjusted, by means of set screw 10, either toward or from the operator or toward either side, i. e., along the rod 4. Elevation or depression of the rod 11 can be obtained by means of set screw 12 and finally the mirror itself may be turned in practically any desired direction by means of the ball and socket joints 14, 15. It should also be noted that by attaching the mirror near its upper edge as described the radius of movement is further increased.

I have shown the set screws as comparatively large, the reason being that the device is primarily for use of invalids or persons in a convalescent stage, who, due to their weakened condition, require the increased leverage provided.

Having fully described my invention, what I claim as new and desire to secure by Letters Patent is:

1. A device of the class described including a pair of pads, means slidably connecting said pads whereby they may be moved relatively, a set screw for locking said pads in adjusted position, and a mirror supported on said connecting means.

2. A device of the class described including a pair of pads, an upright arm on one pad, an L-shaped arm on the other pad, means adjustably connecting said arms, a block adjustably mounted on the L-shaped arm, a rod adjustably mounted in said block and a mirror on said rod.

3. A device of the class described including a pair of pads, an upright arm on one pad, said arm being provided with an apertured block and a set screw, an L-shaped arm on the other pad, one leg of the L-shaped arm being received in the apertured block, a second block adjustably mounted on the L-shaped arm, a rod adjustably mounted in said last named block, and a mirror carried by said rod.

HARRY JOSEPH KING.